United States Patent
Arbab et al.

(10) Patent No.: US 8,629,610 B2
(45) Date of Patent: Jan. 14, 2014

(54) DISPLAY PANEL

(75) Inventors: Mehran Arbab, Pittsburgh, PA (US);
Adam D. Polcyn, Pittsburgh, PA (US);
Deirdre D. Ragan, Clemmons, NC (US); Michael Buchanan, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 500 days.

(21) Appl. No.: 12/141,131

(22) Filed: Jun. 18, 2008

(65) Prior Publication Data

US 2008/0290784 A1    Nov. 27, 2008

Related U.S. Application Data

(63) Continuation-in-part of application No. 11/653,141, filed on Jan. 12, 2007.

(60) Provisional application No. 60/758,376, filed on Jan. 12, 2006.

(51) Int. Cl.
*H01J 1/62* (2006.01)
*G09F 13/18* (2006.01)
*F21V 7/04* (2006.01)

(52) U.S. Cl.
USPC ............... 313/498; 362/559; 362/561

(58) Field of Classification Search
USPC .................... 313/498; 362/559, 561
See application file for complete search history.

(56) References Cited

U.S. PATENT DOCUMENTS

| 3,083,551 | A | | 4/1963 | Pilkington |
| 3,220,816 | A | | 11/1965 | Pilkington |
| 3,843,346 | A | | 10/1974 | Edge et al. |
| 4,092,518 | A | * | 5/1978 | Merard ............... 219/121.69 |
| 4,466,562 | A | | 8/1984 | DeTorre |
| 4,671,155 | A | | 6/1987 | Goldinger |
| 4,746,347 | A | | 5/1988 | Sensi |
| 4,792,536 | A | | 12/1988 | Pecoraro et al. |
| 5,030,593 | A | | 7/1991 | Heithoff |
| 5,030,594 | A | | 7/1991 | Heithoff |
| 5,206,496 | A | * | 4/1993 | Clement et al. ............... 250/271 |
| 5,240,886 | A | | 8/1993 | Gulotta et al. |
| 5,385,872 | A | | 1/1995 | Gulotta et al. |

(Continued)

FOREIGN PATENT DOCUMENTS

EP    0 622 343    2/1994
EP    0 710 857    8/1996

(Continued)

OTHER PUBLICATIONS

Breck Hitz, "Femtosecond Lasers Fabricate Improved Optical Waveguides", Photonics TechnologyWorld, Oct. 2004 Edition.

(Continued)

*Primary Examiner* — Nimeshkumar Patel
*Assistant Examiner* — Jacob R Stern
(74) *Attorney, Agent, or Firm* — Andrew C. Siminerio

(57) ABSTRACT

The present invention discloses a display panel 10 having a substrate 12 with one or more surfaces and one or more features 30 within the substrate 12. When electromagnetic radiation is introduced at or directed toward one or more surfaces of the substrate 12, the features 30 redirect the electromagnetic radiation in one or more predetermined directions.

13 Claims, 3 Drawing Sheets

(56) References Cited

U.S. PATENT DOCUMENTS

| | | | |
|---|---|---|---|
| 5,393,593 A | 2/1995 | Gulotta et al. | |
| 5,500,031 A | 3/1996 | Atkins et al. | |
| 5,637,244 A | 6/1997 | Erokhin | |
| 5,647,040 A | 7/1997 | Modavis et al. | |
| 5,707,908 A | 1/1998 | Komine et al. | |
| 5,767,483 A * | 6/1998 | Cameron et al. | 219/121.85 |
| 5,914,807 A | 6/1999 | Downing | |
| 6,284,685 B1 | 9/2001 | Borrelli et al. | |
| 6,333,486 B1 | 12/2001 | Troitski | |
| 6,334,018 B1 | 12/2001 | Fokine | |
| 6,392,683 B1 | 5/2002 | Hayashi | |
| 6,432,278 B2 | 8/2002 | Sugioka et al. | |
| 6,436,857 B1 | 8/2002 | Brueck et al. | |
| 6,442,311 B1 | 8/2002 | Barbarossa et al. | |
| 6,573,026 B1 | 6/2003 | Aitken et al. | |
| 6,728,464 B1 * | 4/2004 | Waldmann | 385/147 |
| 6,740,846 B1 * | 5/2004 | Troitski et al. | 219/121.69 |
| 6,900,941 B2 | 5/2005 | Kaminsky et al. | |
| 6,957,904 B2 | 10/2005 | Randall | |
| 2002/0046994 A1 | 4/2002 | Miesak | |
| 2002/0186924 A1 | 12/2002 | Kohnke et al. | |
| 2003/0005728 A1 | 1/2003 | Dabby | |
| 2003/0076487 A1 | 4/2003 | Cannon et al. | |
| 2003/0099452 A1 | 5/2003 | Borrelli et al. | |
| 2003/0111446 A1 | 6/2003 | Troitski | |
| 2003/0189031 A1 * | 10/2003 | Troitski et al. | 219/121.69 |
| 2004/0031234 A1 | 2/2004 | Emde | |
| 2004/0071420 A1 | 4/2004 | Sezerman et al. | |
| 2004/0113549 A1 * | 6/2004 | Roberts et al. | 313/512 |
| 2005/0073229 A1 | 4/2005 | Wimbert et al. | |
| 2005/0141840 A1 | 6/2005 | Schroeder et al. | |
| 2007/0262880 A1 * | 11/2007 | Curtis | 340/901 |

FOREIGN PATENT DOCUMENTS

| | | |
|---|---|---|
| EP | 0 797 112 | 9/1997 |
| EP | 1 138 516 | 3/2001 |
| EP | 1 408 362 | 4/2004 |
| EP | 1 533 632 | 5/2005 |
| JP | 06-118257 | 4/1994 |
| JP | 06-258674 | 9/1994 |
| JP | 10-265243 | 10/1998 |
| JP | 2000-033263 | 2/2000 |
| JP | 2002-066769 | 3/2002 |
| JP | 2002-255579 | 9/2002 |
| JP | 2003-012346 | 1/2003 |
| JP | 2003-035809 | 2/2003 |
| JP | 2003-321252 | 11/2003 |
| JP | 2004-117774 | 4/2004 |
| JP | 2005-067933 | 3/2005 |
| JP | 2005-255512 | 9/2005 |
| WO | 01/23923 | 4/2001 |
| WO | 2005/024479 | 3/2005 |
| WO | 2005/040874 | 5/2005 |
| WO | 2005/064381 | 7/2005 |
| WO | 2007/082045 A1 | 7/2007 |
| WO | 2008/036508 A1 | 3/2008 |

OTHER PUBLICATIONS

Yan Li et al, "Permanent Computer-Generated Holograms Embedded in Silica Glass by Femtosecond Laser Pulses", Optics Express, vol. 13, No. 7, pp. 2433-2438, Apr. 4, 2005.

W. Reichman et al, "Femtosecond Laser Writing of Waveguide Structures in Sodium Calcium Silicate Glasses", Proceedings of SPIE, vol. 5714, pp. 238-244 (2005).

C. Schaffer et al, "Micromachining Bulk Glass by Use of Femtosecond Laser Pulses with Nanojoule Energy", Optics Letters, vol. 26, No. 2, pp. 93-95, Jan. 15, 2001.

K. M. Davis et al, "Writing Waveguides in Glass with a Femtosecond Laser", Optics Letters, vol. 21, No. 21, pp. 1729-1731, Nov. 1, 1996.

V. R. Bhardwaj et al, "Femtosecond Laser-Induced Refractive Index Modification in Multicomponent Glasses", Journal of Applied Physics, American Institute of Physics, vol. 97, No. 8, pp. 83102 to 83102-9, Apr. 4, 2005.

International Search Report, PCT/US2009/046879, dated Sep. 30, 2009.

* cited by examiner

DISPLAY PANEL

CROSS-REFERENCE TO RELATED APPLICATION

This application is a continuation-in-part of U.S. application Ser. No. 11/653,141 filed Jan. 12, 2007, which claimed priority to U.S. Provisional Application No. 60/758,376, filed Jan. 12, 2006, both of which applications are herein incorporated by reference in their entirety.

FIELD OF THE INVENTION

The present invention relates generally to display devices and signaling apparatus and methods for making the same and, in one particular non-limiting embodiment, to display devices and signaling apparatus having transparent substrates and methods for making the same.

BACKGROUND

Various types of display devices, e.g., display panels, such as signs, signaling apparatus, etc. are in wide use. One type of conventional display panel is made by printing letters and/or numerals on a substrate using paint, dyes, etc. Substrates such as steel, wood, glass, etc. can be used to make the display panel. Examples of such display panels include common placards and signs. Another type of conventional display panel uses a dynamic display. Examples of such dynamic display panels include liquid crystal displays, light emitting diode (LED) displays, etc. Still another type of conventional display panel includes neon tubes and similar static devices that display more or less fixed information.

For aesthetic or practical purposes, it may be desirable to choose one type of display panel rather than another. For example, a sign with letters and/or numbers on a transparent substrate, such as a glass store window, allows customers to see through most of the window into the store to view the goods on display. As another example, it may be desirable to use a neon sign to convey information when a person wants to be able to turn the sign on at night but leave it off during the daytime.

It would be desirable to provide a display device having improved properties as compared to known display devices. It would also be desirable to provide a display device capable of directing or redirecting electromagnetic radiation in one or more predetermined directions.

SUMMARY OF THE INVENTION

A device comprises a substrate and at least one radiation-directing feature within the substrate. The feature is configured to direct at least a portion of electromagnetic radiation entering the substrate in a predetermined direction.

A display device comprises a substrate having a viewing surface and at least one radiation-directing feature in the substrate. The feature is configured to direct at least a portion of the electromagnetic radiation in the substrate toward the viewing surface.

A method of making a display panel comprises focusing a beam of radiation inside a substrate to form a radiation directing feature configured to direct at least a portion of the electromagnetic radiation introduced into in the substrate in a predetermined direction.

BRIEF DESCRIPTION OF THE DRAWINGS

The invention will be described with reference to the following drawing figures wherein like reference numbers identify like parts throughout.

DETAILED DESCRIPTION OF THE INVENTION

Figure 1:
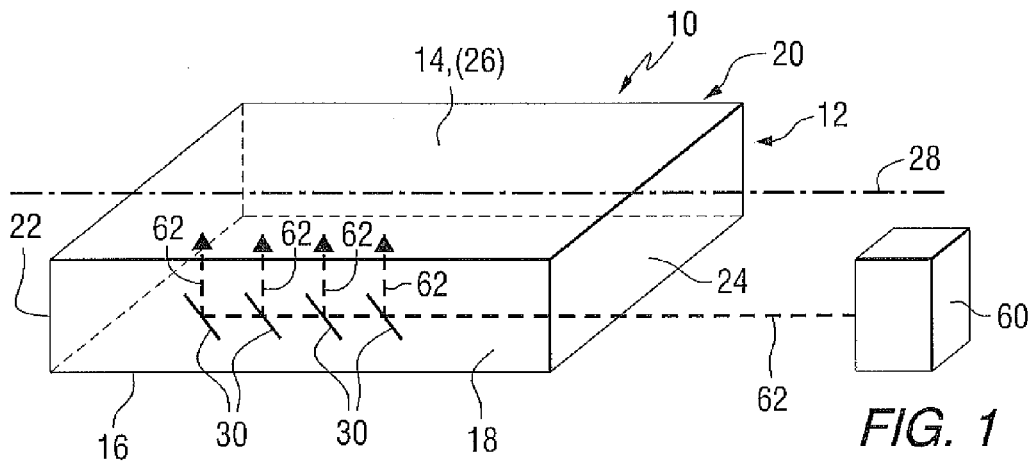
FIG. 1 is a schematic view (not to scale) of a portion of a display device incorporating features of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. Additionally, all documents, such as but not limited to issued patents and patent applications, referred to herein are to be considered to be "incorporated by reference" in their entirety. The "visible transmittance" and "dominant wavelength" values are those determined using the conventional methods.

The present invention provides a novel article that can be, but is not limited to, a display panel for directing light in one or more predetermined directions. An image, such as but not limited to, a message, signal, logo, symbol, etc. (individually and collectively referred to as "images" herein) can be displayed on the display panel. In some embodiments, the image may not always be visible to the naked eye. For example, in order to see the image, one or more surfaces of the panel can be illuminated. As used herein, the term "surface" includes both the major surfaces of the article (e.g., for a rectangular article the front and back surfaces) as well as the edges (sides) of the article. In one non-limiting embodiment, when one or more surfaces of the panel is illuminated, for example, by edge lighting, an image is visible on at least one surface of the panel.

For purposes of the following discussion, the invention will be discussed with reference to use with a "display panel". As used herein, the term "display panel" refers to any article designed to direct electromagnetic radiation and/or display one or more images in accordance with the practice of the invention. Examples of display panels include, but are not limited to, signage, signaling devices, windows, display screens, windshields, sidelights, back lights, sunroofs, and moon roofs, just to name a few. However, it is to be understood that the invention is not limited to use with these specifically referenced articles but could be practiced with articles in any desired field, such as but not limited to laminated or non-laminated residential and/or commercial windows, insulating glass units, and/or transparencies for land, air, space, above water and under water vehicles. Therefore, it is to be understood that the specifically disclosed exemplary embodiments are presented simply to explain the general concepts of the invention and that the invention is not limited to these specific exemplary embodiments.

Figure 2:
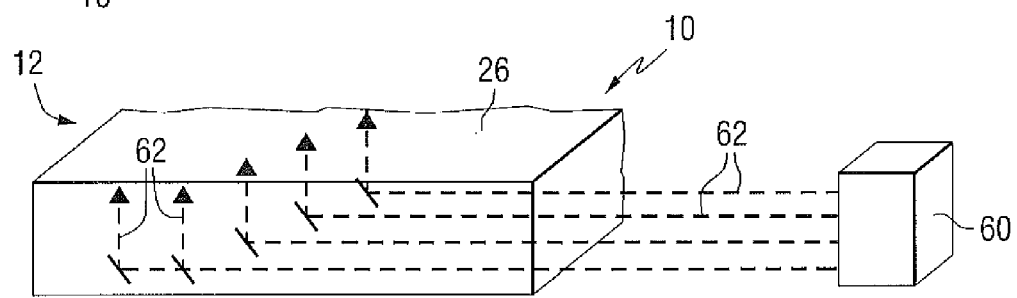
FIG. 2 is a schematic view (not to scale) of a portion of a further display device incorporating features of the invention.
Figure 3:
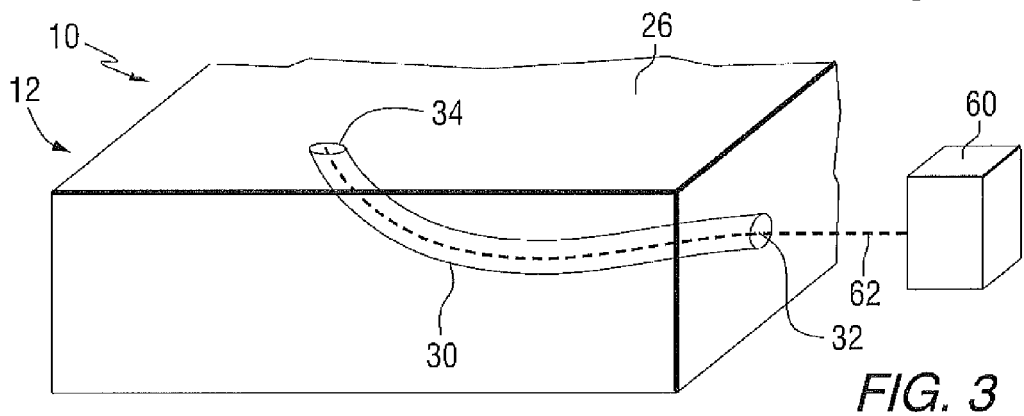
FIG. 3 is a schematic view (not to scale) of a portion of a still further display device incorporating features of the invention.

A non-limiting display panel 10 incorporating features of the invention is illustrated in FIGS. 1 to 3. As best seen in FIGS. 1 and 2, the display panel 10 includes a substrate 12 which, in the illustrated non-limiting embodiment, is shown as a rectangular substrate 12 having a first major surface (front surface) 14, a second major surface (rear surface) 16, a front edge 18, a back edge 20, a left edge 22 and a right edge 24. In the illustrated embodiment, the first major surface 14 of the substrate 12 comprises a viewing surface 26. A substrate axis 28 extends at least partly through the substrate 12. In the illustrated non-limiting embodiment, at least a portion of the substrate axis 28 is substantially parallel to the viewing surface 26. It is to be understood that the invention is not limited to use with rectangular substrates but could be used with any substrate shape, such as but not limited to spherical, square, conical, pyramidal, elliptical, curved, or cylindrical, just to name a few. Additionally, the opposed surfaces or edges of the substrate 12 do not necessarily have to be parallel to each other. The display panel 10 includes one or more energy-directing features 30, as described in more detail below. The features 30 are configured to selectively or preferentially direct electromagnetic radiation, e.g., visible light, UV radiation, IR radiation, etc., in one or more predetermined directions, e.g., toward the viewing surface 26.

In the broad practice of the invention, the substrate 12 of the display panel 10 can be of any desired material having any desired characteristics. For example, the substrate 12 can be transparent or translucent to visible light. By "transparent" is meant having visible light transmittance of greater than 0% to less than 100%. Alternatively, the substrate 12 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethyl methacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates or mixtures or combinations of any of the above. For example, the substrate 12 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. The ribbon is then cut and/or shaped and/or heat treated as desired. Examples of float glass processes are disclosed in U.S. Pat. Nos. 4,466,562 and 4,671,155. Although not limiting to the invention, examples of glass suitable for the substrate 12 are described in U.S. Pat. Nos. 4,746,347; 4,792,536; 5,030,593; 5,030,594; 5,240,886; 5,385,872; and 5,393,593. The substrate 12 can be of any desired dimensions, e.g., length, width, shape, or thickness. In one exemplary non-limiting embodiment, the substrate 12 can be 1 mm to 10 mm thick, e.g., 1 mm to 5 mm thick, or 1.5 mm to 2.5 mm, or 1.8 mm to 2.3 mm.

In one non-limiting embodiment, the substrate 12 can have a high visible light transmittance at a reference wavelength of 550 nanometers (nm). By "high visible light transmittance" is meant visible light transmittance at 550 nm greater than or equal to 85%, such as greater than or equal to 87%, such as greater than or equal to 90%, such as greater than or equal to 91%, such as greater than or equal to 92. A non-limiting high visible light transmittance glass useful for the practice of the invention is disclosed in U.S. Pat. Nos. 5,030,593 and 5,030,594 and is commercially available from PPG Industries, Inc. under the mark Starphire®.

In one non-limiting embodiment, the features 30 have a different refractive index than the substrate material. The difference in refractive index can be achieved in any desired manner. The following represent three non-limiting exemplary manner (1)-(3) in which the difference the in refractive index can be achieved. The features 30 can (1) have a different density, for example, higher density, than the substrate surrounding its immediate vicinity; (2) have a different composition than the substrate surrounding its immediate vicinity; or (3) be mechanically different than the substrate surrounding its immediate vicinity, e.g., have localized stress areas and/or include fissures in the substrate. As used herein, "immediate vicinity" refers to a distance less than 1 millimeter away from the feature 30, such as less than 800 micrometers, such as less than 500 micrometers, such as less than 200 micrometers, such as less than 100 micrometers, such as less than 50 micrometers, such as less than 10 micrometers, such as in the range of 10 microns to 1 millimeter.

The features 30 can have a refractive index that is different from the surrounding substrate 12. In one non-limiting embodiment, the features 30 can have a refractive index that is different, e.g., higher, than the surrounding material. For example, the features 30 can have a refractive index that is at least 0.002 different, e.g., higher, than the surrounding material, such as 0.004 higher, such as 0.006 higher, such as 0.008 higher, such as 0.01 higher, such as 0.02 higher, such as 0.03 higher, such as 0.05 higher, such as 0.07 higher, such as 0.09 higher, such as 0.1 higher, such as 0.2 higher, such as 0.3 higher, such as 0.5 higher, such as 0.7 higher, such as 0.9 higher, such as 1.0 higher than the refractive index of the substrate 12 surrounding its immediate vicinity. The change in the refractive index between the feature 30 and the surrounding material can be gradual or abrupt. For discrete features (such as those in FIGS. 1 to 2A) the change in refractive index can be more gradual than for the continuous feature 30 shown in FIG. 3 (where a more abrupt change in refractive index is desirable to prevent or lessen electromagnetic energy "leaking" out of the continuous feature).

For a glass substrate 12, when manner (1) above is used, the feature 30 can be made of glass and can have a different, e.g., higher, density than the glass in its immediate vicinity. When manner (2) above applies, the feature 30 can, for example, result from the polymerization of a silica network within the bulk of the glass substrate 12 that could happen as a result of sodium atoms moving into the glass and away from the feature 30. When manner (3) above applies, localized stresses and/or fissures can be formed in the glass substrate 12 to create new interfaces within the substrate 12.

Figure 2A:
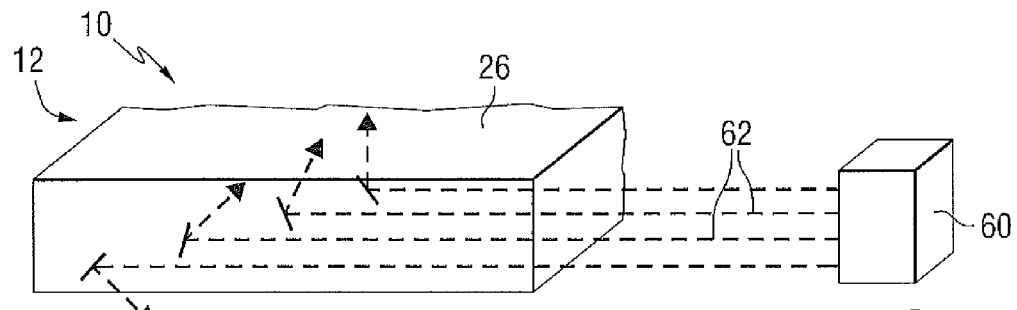
FIG. 2A is a schematic view (not to scale) of a portion of an additional display device incorporating features of the invention.

According to the present invention, the features 30 can be of any shape and various features 30 can be of the same or a different shape. In the non-limiting embodiment shown in FIGS. 1 and 2, the features 30 have a length (viewed from the side) of less than or equal to 1 millimeter, such as, ranging from 400 nanometers to 1 millimeter, for example, 1 micron to 5 microns. Each feature 30 can have the same or a different size. The embodiments shown in FIGS. 1 and 2 utilize a plurality of spaced individual features 30. In FIG. 1, at least some of the features 30 are arranged in a row (i.e., in a common plane). In FIGS. 2 and 2A, at least some of the features 30 are arranged in different rows (i.e. in different planes). The display panel 10 can include features 30 in one or more planes and having one or more orientations. In the embodiment shown in FIG. 3, the feature 30 is in the form of a waveguide or conduit extending at least partly through the substrate 12 and having a first end 32 and a second end 34. The feature in FIG. 3 can have a tubular shape with any desired cross-section, such as round, oval, polygonal (e.g. square, triangular, etc), etc. The first and second ends 32, 34 need not terminate at one of the surfaces of the substrate 12 but could begin and end within the substrate 12.

Figure 4:
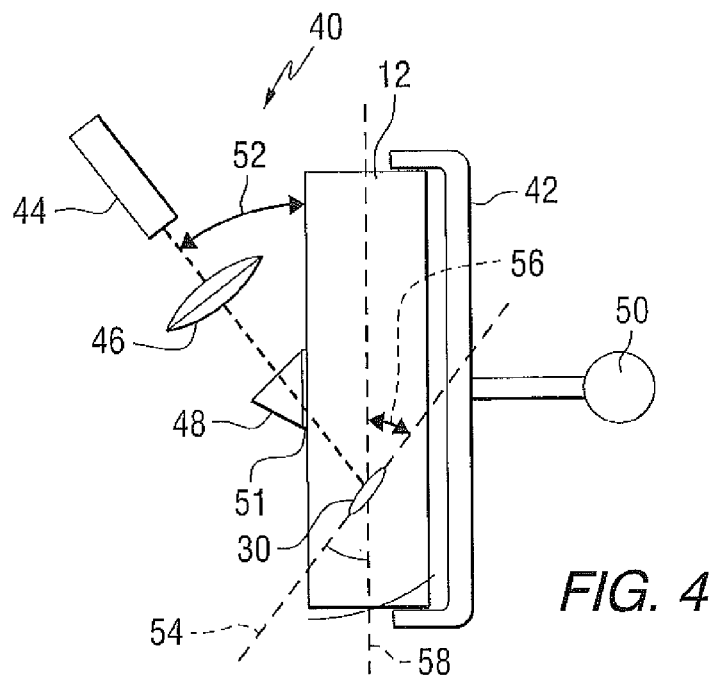
FIG. 4 is a schematic view (not to scale) of an apparatus for making a display device having features of the invention.

An exemplary method of making a display panel 10 of the invention will first be described with reference to FIG. 4 and then operation of various embodiments of the display panel 10 will be described. An exemplary apparatus 40 for making display devices of the invention is shown in FIG. 4. The apparatus 40 includes a holding device 42 for holding and securing the substrate 12. The apparatus 40 further includes a laser 44 and a focusing lens 46. Optionally, the apparatus 40 can further include or utilize a conventional prism 48. A film 51 of an index matching fluid, such as water, can be located between the prism 48 and the surface of the substrate 12.

The laser 44 can be a conventional pulsed laser, such as but not limited to a conventional nanosecond, picosecond, or femtosecond pulsed laser. Suitable lasers include, but are not limited to, titanium doped sapphire lasers or yttrium aluminum garnet (YAG) lasers, for example with wavelengths in the near infrared region. Particularly suitable lasers include pulsed lasers having a wavelength in the range of 280 nm to 1560 nm, such as 700 nm to 1064 nm; a pulse time in the range of 100 femtoseconds to 5 nanoseconds; and a power in the range of 1 to 5 millijoules.

The lens 46 can be any conventional lens, such as but not limited to a 10× to 20× microscope objective. The lens 46 can be highly transparent to the electromagnetic radiation discharged by the laser 44.

The substrate 12 and laser 44 can be moved with respect to each other. For example, in the illustrated embodiment, the holding device 42 includes a movement device 50 that can be used to move the substrate 12 in any direction relative to the laser 44. However, it is equally conceivable that the laser 44, focusing lens 46, and prism 48 assembly could be moved rather than the substrate 12.

To form a feature 30 in the substrate 12, the apparatus 40 is adjusted such that the focal point of the laser 44 is inside the substrate 12. When the laser 44 is energized, the electromagnetic radiation passes through the focusing lens 46 and through the prism 48 into the substrate 12. The prism 48 helps reduce the reflection loss that would occur if the laser 44 were pointed at an angle with respect to the substrate surface. An index matching fluid, such as an oil, can be placed between the prism 48 and the substrate 12. At the focal point, the electromagnetic radiation causes the feature 30 to be formed, for example by changing the density and/or optical properties of the substrate material. As will be appreciated from FIG. 4, since the laser 44 is positioned at an angle 52 with respect to the surface of the substrate 12, the longitudinal axis 54 of the feature 30 will also be offset by a similar angle 56 from a substrate plane 58 passing through the feature 30. After one feature 30 is formed, the movement device 50 can be activated to shift the substrate 12 to reposition the focal point of the laser 44 inside the substrate 12. The laser 44 can then be activated again and another feature 30 formed in the substrate 12. If the substrate 12 is simply translated along the plane 58, a structure such as that shown in FIG. 1 results. Based upon the angle of the laser 44 with respect to the substrate 12, the features 30 will typically have an oval or circular shape, for example having a diameter (long axis if an oval) in the range of 400 nm to 1 mm, such as 400 nm to 300 microns, such as 400 nm to 200 microns, such as 400 nm to 100 microns, such as 400 nm to 50 microns, such as 400 nm to 10 microns, such as 400 nm to 5 microns, such as 400 nm to 1 micron. As will be appreciated, the smaller the diameter of the feature 30 and the fewer features 30 per unit area of the substrate 12, the less visible the features 30 will be to the naked eye.

If the substrate 12 is translated in the direction of plane 58 but also varied in distance from the laser 44, a structure such as that shown in FIG. 2 can be formed. If the substrate 12 is translated and also rotated or pivoted, a structure such as that shown in FIG. 2A can be formed.

Alternatively, the apparatus 40 can be used to form a cylindrical or tube-shaped feature 30 as shown in FIG. 3. The cylindrical feature 30 can be straight or curved and acts like an optical channel or waveguide. As will be appreciated by one skilled in the art, to form a tubular-like feature 30, the substrate 12 can be positioned in a similar manner as shown in FIG. 4. The focal point of the laser 44 can be positioned at or near an edge, such as the lower edge, of the substrate 12 and the laser 44 activated. While the laser 44 is activated (e.g. pulsed), the movement device 50 can be used to slowly or incrementally move the substrate 12 to adjust the position of the focal point of the laser 44 to form the tubular-like feature 30 shown in FIG. 3.

Figure 5A:
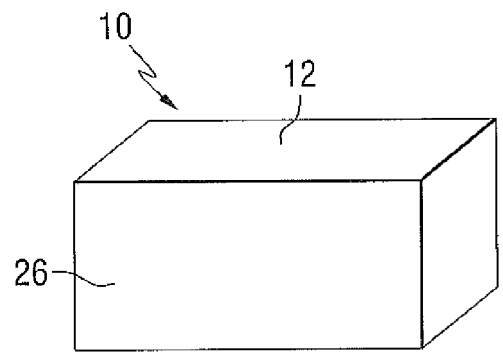
FIGS. 5A and 5B are schematic views (not to scale) of a display device of the invention in an inactivated (5A) and an activated (5B) state.

Operation of various non-limiting embodiments of display panels 10 incorporating features of the invention will now be described. Looking at FIG. 1, the features 30 are formed in the substrate 12 and positioned to form a pattern or image when illuminated. For example, FIG. 5a illustrates the viewing surface 26 of the display panel 10 when the display panel 10 is not illuminated. The features 30 may be undetectable or only slightly detectable by viewing with the naked eye. This is because of the small size of the features 30. However, returning to FIG. 1, when an electromagnetic radiation source (e.g., light source 60) is activated and directed at the substrate 12, for example at the right edge 24 of the substrate 12, at least some of the electromagnetic radiation 62 from the light source 60 is directed into the interior of the substrate 12.

Figure 5B:
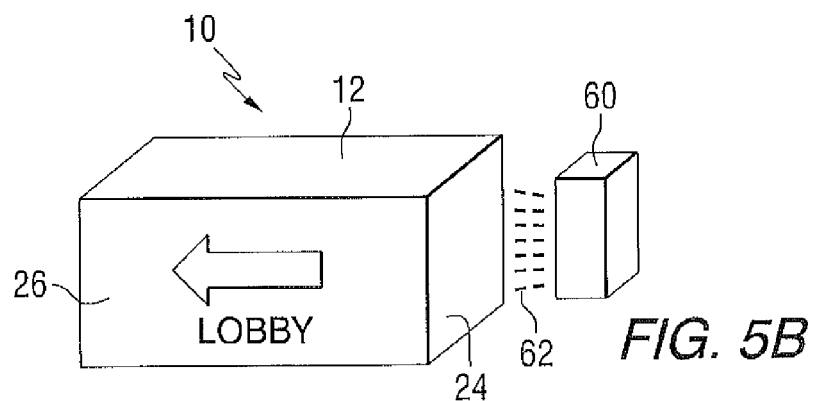

As can be appreciated from FIG. 1, when the electromagnetic radiation 62 contacts the features 30, at least a portion of the radiation 62 that strikes the features 30 is redirected from its original path to a different, predetermined direction, e.g., toward the viewing surface 26. As will be appreciated from the drawings, the "predetermined direction" depends, at least partly, upon the orientation of the features 30. Thus, the features 30 act like small mirrors reflecting or redirecting the path of the electromagnetic radiation 62 that contacts them. FIG. 5*b* illustrates the viewing surface 26 of the display panel 10 when the light source 60 is illuminated to reveal the image formed by the radiation reflected from the features 30 arranged in the substrate 12.

The embodiment shown in FIG. 2 acts in a similar manner to direct the radiation 62 primarily toward the viewing surface 26. However, in the embodiment shown in FIG. 2A, the electromagnetic radiation 62 is directed in several different directions.

The embodiment shown in FIG. 3 could act in a similar manner as that described above. That is, a light source 60 is positioned adjacent the first end 32 of the elongated feature 30. When the light source 60 is activated, electromagnetic radiation 62 from the light source 60 passes through the first end 32 into the feature 30 and is directed from the first end 32 to the second end 34. Because of the refractive index difference between the feature 30 and the surrounding glass, at least a portion of the light entering the feature 30 is not reflected back out into the glass substrate but, rather, remains in the feature 30. That is, the electromagnetic radiation travels through the feature 30 rather than being reflected back out into the body of the substrate.

In a broad aspect of the invention, the features 30 can be three-dimensional and can have any aspect ratio. Each feature 30 can have the same or different aspect ratio. The features 30 can be oriented at any angle relative to a surface of the substrate 12. The various features 30 can be oriented at the same or different angles. For example, one or more features 30 can be oriented at an angle of 45° relative to a surface 26 of the substrate 12 through which an image will be viewed. The number of features 30 per unit area in the substrate can be varied in any manner.

In one non-limiting aspect of the invention, when one or more surfaces of the substrate 12 are illuminated, an image is visible through at least one surface of the substrate 12. As stated above, illuminating one or more of the surfaces of the substrate includes edge lighting. In a non-limiting embodiment, the image can be more visible on one surface of the substrate 12 than on the other surfaces (i.e., the image is more intense on one surface of the substrate 12 than the others). This effect can occur when the features 30 in the substrate 12 are engineered to cause the illuminated light to be re-directed preferentially in one direction as opposed to being randomly directed.

In one non-limiting embodiment, the features 30 re-direct light from the light source 60 that strikes the features 30 primarily in one direction. By "primarily" is meant that greater than 50 percent of the re-directed light goes in one predetermined direction, for example, more than 75% of the re-directed light, e.g., or more than 85% of the re-directed light. In other words, the light is directed anisotropically in a predetermined manner as opposed to isotropically in all directions. Alternatively, as will be appreciated from FIG. 2A, the features 30 can be grouped to re-direct light in several different directions. For example, one group of features 30 can re-direct light in a first direction, and another group of features 30 can re-direct light in a different direction, etc.

There is no limitation as to what types of images can be displayed by the display panel 10. For example, the image can be words, various shapes, logos, symbols, etc. in the shape. Various colors can be visible through the substrate 12 by using different colored light sources 60.

In a non-limiting embodiment, different images are displayed in the substrate 12 depending on what surface of the substrate 12 is illuminated. For example, "NO" can be displayed when one surface of the substrate 12 is illuminated, and "YES" can be displayed when another surface is illuminated. This can be accomplished by orienting various features and/or light sources, such as described below with respect to FIG. 7.

In another non-limiting embodiment, multiple surfaces of the substrate 12 can be illuminated at the same time with different colored light sources 60 to display a multi-colored image. Alternatively, different features 30 can preferentially reflect electromagnetic radiation of different wavelengths. Thus, multiple features 30 illuminated with the same light source can direct or reflect multiple colors.

According to the present invention, the display panel 10 can be used to re-direct light for a variety of purposes because the features 30 within the substrate can direct light in one or more specific directions when one or more surfaces of the substrate 12 are illuminated. For example, the display panel 10 can be a skylight used to re-direct sunlight in a particular direction within a room. Thus, in a non-limiting embodiment, a suitable light source is natural light, for example, direct solar rays.

According to the present invention, the source of electromagnetic radiation, i.e. light source 60, for illuminating the surface of the substrate can be any light source that can be used to provide electromagnetic radiation to form the desired message, sign, logo, advertisement, etc. in the substrate 12. Alternatively, the light source 60 can provide electromagnetic radiation in the non-visible wavelength range, such as the infrared (IR) and/or ultraviolet (UV) wavelength ranges. The features 30 can be configured such that they reflect radiation only in these non-visible ranges to form an image that is invisible to the naked eye but could be detected with suitable filters, lenses, or receivers. Suitable light sources include, but are not limited to, visible wavelength lasers, halogen and incandescent lamps, LEDs of various colors, IR radiation sources, UV radiation sources, and the like. The illumination of the surface can be directly from the light source 60 or indirectly, for example, from an optical fiber that is proximate to a light source 60. Illuminating the surface indirectly enables the light source 60 to be placed at a distance from the article. For example, the features 30 can be arranged to form a particular image or indicia to identify the panel 10 as belonging to a particular person or group. The light source 60 can be a non-visible wavelength light source, such as an IR wavelength light source. When the panel 10 is illuminated with the IR wavelength light source, only an observer with the IR wavelength viewing capability (such as IR sensitive goggles) can see the resultant image.

The article of the present invention can be used in various ways. For example, the article can be used in vehicles as, for example, a center high mounted stop lamp (CHMSL), a signaling device such as a turn signal, etc., or, a heads-up display (HUD). The article of the present invention can also be used as signage for a restaurant, for example, or to display a symbol such as a logo in a glass ply.

In a non-limiting embodiment, the article of the invention can be included in a substrate that contains photoactive elements or as a cover for a photovoltaic device. The article of the invention re-directs light to the photoactive elements for the purposes of increasing the amount of energy generated by the photoactive elements. As another non-limiting example, the article of the invention is in a window to re-direct light to specific areas of a room for lighting purposes, such as an area that may not receive much natural light.

In another possible non-limiting application, features 30 can be induced that scatter light strongly when a light source illuminates the display panel 10 from a particular surface or edge, thereby revealing the defect pattern (features 30) and obscuring what is behind the display panel 10. If the light source is directed from any of the other surfaces or edges, the defect pattern can be barely visible, if at all. Without the light source, the defect pattern can be completely or substantially invisible to the unaided eye. By turning the light source on and off, what is behind the glass can be obscured or revealed remotely.

In one non-limiting embodiment, the substrate 12 can be transparent glass. The features 30 can be formed to direct electromagnetic radiation toward (or predominately toward) one surface 14 but not the opposite surface 16. By "predominately toward" is meant that over half of the electromagnetic radiation encountering the features 30 is directed in a predetermined direction. Thus, the panel 10 is transparent when viewed from either side 14 or 16 when the light source 60 is off. However, when the light source 60 is turned on, the light directed toward the front surface 14 by the features 30 would prevent or obscure a viewer on the front surface 14 side of the panel 10 from seeing through the panel 10 while still allowing a viewer on the rear surface 16 side to see through the panel 10. Thus, the panel would allow bidirectional viewing when the light source 60 is off but unidirectional viewing when the light source 60 is turned on. This aspect of the invention would be useful for privacy glass and/or security glass. The perceived color of the reflected radiation could be predetermined by selecting the wavelength of the electromagnetic radiation produced by the light source 60.

Additionally, the wavelength of light introduced by a radiation source 60 into the substrate 12 can be selected to match or complement the transmission properties of the substrate material. For example, if the substrate material transmits green light but blocks or absorbs blue light or red light, a radiation source 60 configured to emit green light could be used. That is, the radiation source 60 can be selected to match the wavelength or wavelength range most transparent to the substrate 12. Alternatively, the composition of the substrate 12 can be selected to complement or match the wavelength desired to be transmitted. The substrate material or composition can be selected to absorb or block (e.g., filter) one or more undesirable wavelengths and transmit one or more desired wavelengths.

Figure 6:
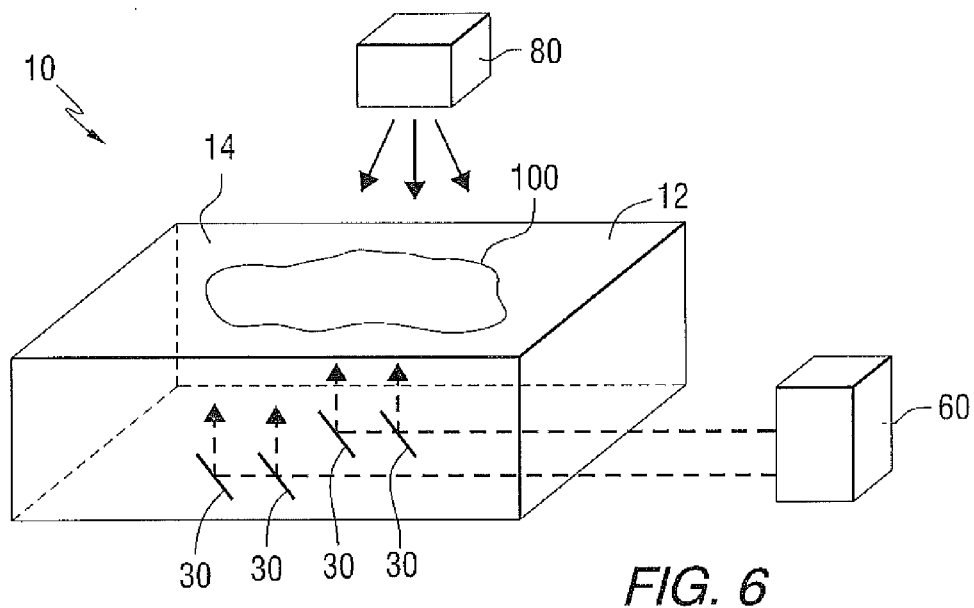
FIG. 6 is a schematic view (not to scale) of another display device of the invention.

Another use for a panel 10 of the invention would be for a screen or surface upon which images could be projected, as shown in FIG. 6. For example, the features 30 could be formed to project or scatter light (as shown in FIG. 2 or 2A) such that the substrate 12 changes from transparent to hazy or opaque (when viewed from the front surface 14) when the light source 60 is turned on. An image 100 could then be projected onto the surface 14 from a projector 80, such as a conventional movie projector, slide projector, and the like. The projector 80 could project a video image or a static image onto the substrate 12, e.g., onto the front surface 14. Thus, the panel 10 could serve a dual purpose. For example, the panel 10 could function as a window or similar transparency when the light source 60 is off and as a screen when the light source 60 is on.

In another aspect of the invention, the display panel 10 can be a laminated structure. For example, the substrate 12 having the features 30 can form one sheet of a multi-sheet laminated article. For example, the substrate 12 can be laminated between two other substrates of the same or different material.

In another non-limiting embodiment, the panel 10 of the invention need not display an image when illuminated but, rather, can be used to redirect electromagnetic radiation, such as but not limited to natural light, in one or more predetermined directions. For example, features 30 of the invention can be incorporated into an architectural transparency, such as a window, sky light, etc., to preferentially direct sunlight toward a particular portion of a room.

Figure 7:
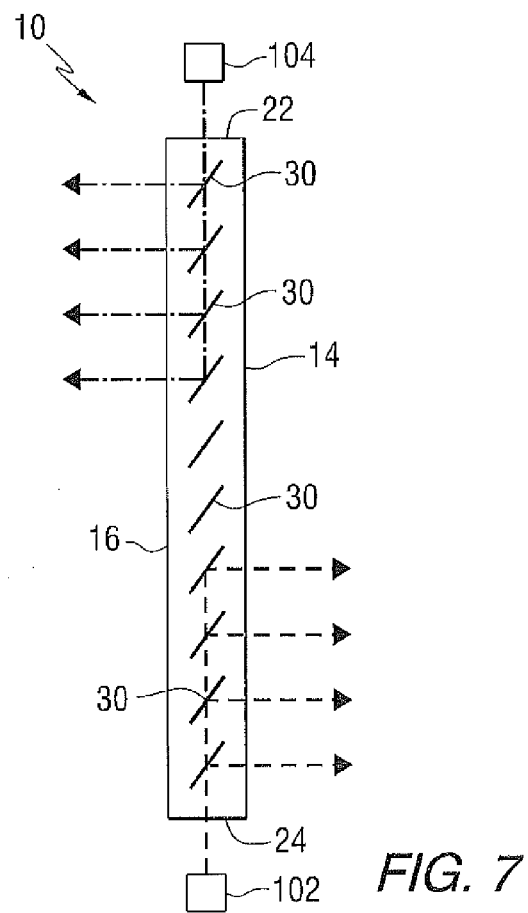
FIG. 7 is a schematic view (not to scale) of a further display device of the invention.

In another aspect of the invention shown in FIG. 7, the display panel 10 can be used to permit bidirectional viewing or to selectively permit unidirectional viewing. In the non-limiting embodiment shown in FIG. 7, the display panel 10 can be positioned, e.g., vertically positioned, between two areas. One radiation source 102 can be positioned at or adjacent one edge (e.g., edge 24) of the panel 10 and another radiation source 104 can be positioned at or adjacent another edge (e.g., edge 22). When the radiation sources are "off", viewing is bidirectional. When the first radiation source 102 is turned on, the radiation (e.g., light, such as colored light) is directed by the features 30 toward the front surface 14, thereby obscuring vision through the panel 10 for a viewer on the side of the front surface 14. Alternatively, if the second radiation source 104 is turned on, the radiation (e.g., light, such as colored light) is directed toward the rear surface 16, thereby obscuring vision through the panel 10 for a viewer on the side of the rear surface 16. If both radiation sources 102, 104 are turned on, then vision through either side 14, 16 of the panel 10 would be obscured. The radiation sources 102, 104 can be configured to emit the same radiation wavelength (i.e., same color) or one radiation source can emit one wavelength and the other radiation source can emit another, different wavelength. While only one column of features 30 is shown in FIG. 7, it is to be understood that a plurality of rows or columns of features 30 could be present.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed is:

1. A device comprising:
    A glass substrate having a viewing surface; and
    at least one fissure within the substrate positioned at an angle to the viewing surface,
    wherein the fissure is configured to direct electromagnetic radiation in a predetermined direction, and
    wherein the fissure has a refractive index that is at least 0.004 different than the refractive index of the substrate in its immediate vicinity.

2. The device of claim 1, wherein the fissure is configured to direct at least a portion of the radiation from an interior of the substrate toward the viewing surface to form an image.

3. The device of claim 1, wherein the fissure is configured to redirect electromagnetic radiation within a predetermined wavelength range.

4. The device of claim 3, wherein the fissure is configured to redirect electromagnetic radiation within the IR and/or UV wavelength ranges.

5. The device of claim 1, including a plurality of fissures configured to direct electromagnetic radiation in a plurality of directions.

6. The device of claim 1, including at least one radiation source adjacent the display device.

7. The device of claim 1, wherein the fissure comprises a tubular feature.

8. The device of claim 1, including an image projector configured to direct an image onto at least one surface of the substrate.

9. A device comprising:
a glass substrate having a viewing surface; and
a plurality of fissures within the substrate positioned at an angle to the viewing surface,
wherein the fissures are configured to direct electromagnetic radiation in a predetermined direction,
wherein the fissures have a refractive index that is at least 0.004 different than the refractive index of the substrate in its immediate vicinity,
wherein the substrate further comprises a second surface, wherein the fissures are configured to direct at least a portion of radiation from a first radiation source toward the viewing surface and to direct at least a portion of electromagnetic radiation from a second radiation source toward the second surface.

10. A display device, comprising:
a glass substrate having a surface;
a plurality of fissures in the substrate positioned at an angle to the surface; and
at least one electromagnetic radiation source configured to introduce electromagnetic radiation into the substrate,
wherein the fissures are configured to direct at least a portion of the electromagnetic radiation introduced into the substrate by the at least one electromagnetic radiation source toward the surface, and
wherein the fissures have a refractive index that is at least 0.004 different than the refractive index of the substrate in its immediate vicinity.

11. A method of making a display panel,
comprising:
focusing a beam of radiation inside a glass substrate at an angle to a surface of the substrate to form at least one fissure configured to direct electromagnetic radiation introduced into the substrate in a predetermined direction,
wherein the at least one fissure has a refractive index that is at least 0.004 different than the refractive index of the substrate in its immediate vicinity.

12. The device of claim 1, wherein,
the device comprises a plurality of fissures,
wherein, when electromagnetic radiation is introduced into the substrate, the fissures are configured to convert the substrate to an opaque substrate relative to at least a first surface of the substrate.

13. The device of claim 12, wherein the device further comprises an image projector configured to direct an image onto at least the first surface of the opaque substrate.

* * * * *